(12) United States Patent
Tanay

(10) Patent No.: US 8,806,764 B1
(45) Date of Patent: Aug. 19, 2014

(54) EXPANDABLE COLLET AND METROLOGY TARGET

(75) Inventor: Michael J. Tanay, Bonney Lake, WA (US)

(73) Assignee: The Boeing Company, Schenectady, NY (US)

( * ) Notice: Subject to any disclaimer, the term of this patent is extended or adjusted under 35 U.S.C. 154(b) by 238 days.

(21) Appl. No.: 13/526,864

(22) Filed: Jun. 19, 2012

(51) Int. Cl.
G01B 5/004 (2006.01)
G01B 5/25 (2006.01)

(52) U.S. Cl.
USPC .......................................... 33/1 CC; 33/645

(58) Field of Classification Search
USPC ................... 33/1 BB, 1 CC, 613, 645
See application file for complete search history.

(56) References Cited

U.S. PATENT DOCUMENTS

| 6,625,898 | B2 * | 9/2003 | Lappen ........................ 33/645 |
| 7,614,154 | B2 | 11/2009 | Cobb |
| 7,614,159 | B2 | 11/2009 | Kilwin et al. |
| 2003/0199229 | A1 * | 10/2003 | Vereen et al. .................. 451/36 |
| 2005/0011080 | A1 * | 1/2005 | Gunderson et al. ............ 33/645 |
| 2006/0156569 | A1 * | 7/2006 | Gunderson ..................... 33/645 |
| 2006/0246821 | A1 * | 11/2006 | Vereen et al. .................... 451/5 |
| 2009/0143885 | A1 * | 6/2009 | Grant et al. ..................... 700/97 |
| 2013/0300861 | A1 * | 11/2013 | Neumann et al. ............. 348/135 |

* cited by examiner

Primary Examiner — G. Bradley Bennett
(74) Attorney, Agent, or Firm — The Small Patent Law Group; Dean D. Small

(57) ABSTRACT

An apparatus comprises a collet, and a metrology target mounted at a first end of the collet. The target provides a reference point at a known distance from a reference point on the on the collet.

20 Claims, 2 Drawing Sheets

EXPANDABLE COLLET AND METROLOGY TARGET

BACKGROUND

Determinant assembly methods utilize features of precision machined parts for location. For instance, determinant assembly holes are drilled at precise locations in two parts to be assembled together. These holes are used to position the parts in a precise relationship. With the parts precisely positioned, fastener systems are installed to fasten the parts together. The determinant assembly holes may also be used to precisely position the fastener systems.

In the aircraft industry, determinant assembly methods may be used to assemble fuselage frames, stanchions and floor beams to form fuselages. Determinant assembly methods may also be used to assemble skin panels, ribs, and spars to form wings boxes.

Parts made of composite material can be difficult to machine. Consequently, the required precision of a determinant assembly hole might not be achieved. For instance, hole centerlines might by slightly off from their nominal positions.

There is a need to determine the precise position of the hole centerlines with respect to a reference, such as a known coordinate system, or a feature or target whose location is known.

SUMMARY

According to an embodiment herein, an apparatus comprises a collet, and a metrology target mounted at a first end of the collet. The target provides a reference point at a known distance from a reference point on the on the collet.

According to another embodiment herein, a determinant assembly system comprises a part having a determinant assembly hole, a collet that fits tightly within the hole, and a metrology target mounted at a first end of the collet. The target provides a reference point at a known distance from a centerline of the collet.

According to another embodiment herein, a method of measuring a hole location with respect to a reference position includes fitting an expandable collet tightly in the hole, mounting a metrology target to the collet at a fixed distance from a centerline of the hole, and measuring distance from the target to the reference position.

These features and functions may be achieved independently in various embodiments or may be combined in other embodiments. Further details of the embodiments can be seen with reference to the following description and drawings.

DETAILED DESCRIPTION

Figure 1:
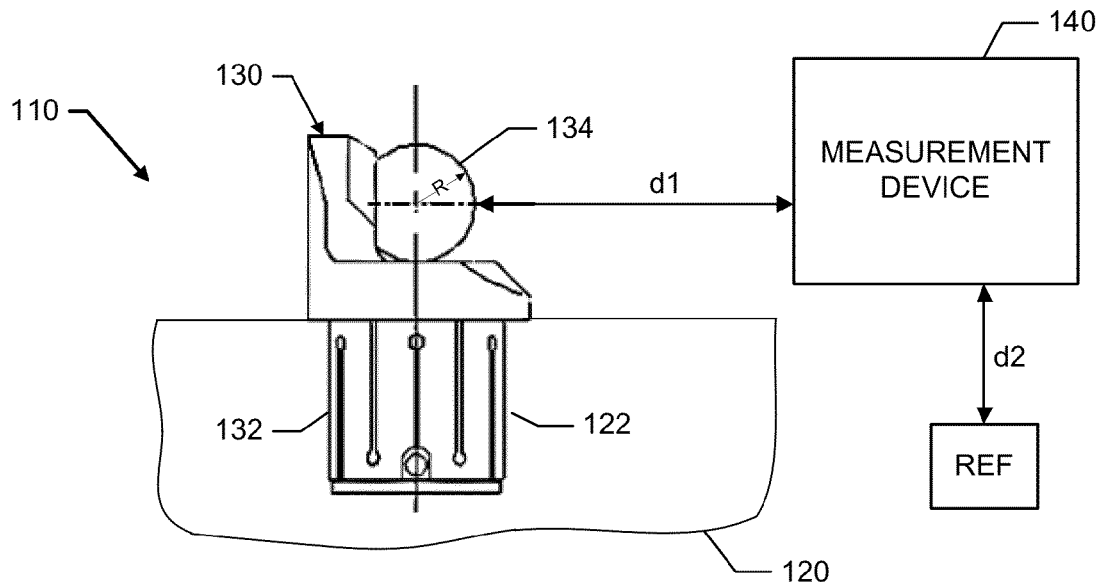
FIG. 1 is an illustration of a determinant assembly system.

Reference is made to FIG. 1, which illustrates a determinant assembly system 110. The system 110 includes a part 120 having a determinant assembly hole 122. The hole 122 has a centerline. Shape of the hole 122 may be conical, funnel-like, inverted funnel-like, or some other shape.

The system 110 further includes an apparatus 130 for measuring a distance to the centerline. The apparatus includes a collet 132, which can be expanded to fit tightly within the hole 122. The apparatus 130 further includes a metrology target 134 mounted at a first end of the collet 132. When mounted, the metrology target 134 provides a reference point at a known distance from the centerline of the collet 132.

The system 110 further includes a measurement system 140 for measuring the distance of the metrology target 134 to a reference position (REF). In some embodiments, the measurement system 140 may include a laser-tracker, laser radar, or other laser-based system, and the metrology target 134 may include a tracking ball. In other embodiments, the measurement system 140 may include a camera-based measurement system, and the metrology target 134 may include a photogrammetry target.

Figure 2:
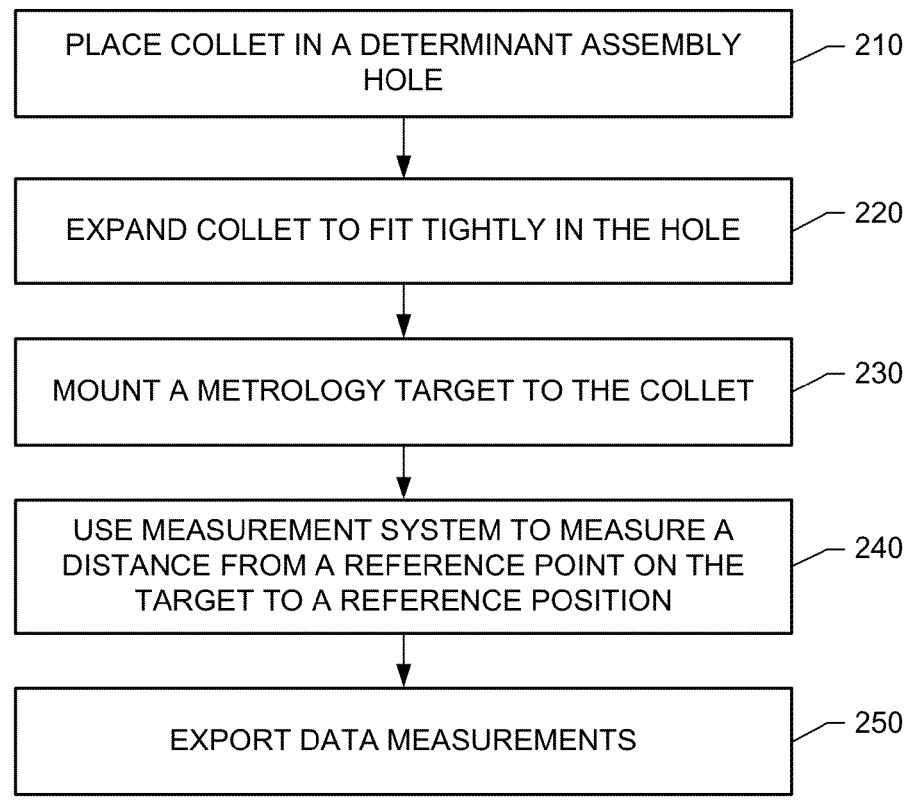
FIG. 2 is an illustration of a method of using the determinant assembly system.

Additional reference is made to FIG. 2, which illustrates a method of using the determinant assembly system 110. At block 210, the collet is placed in the determinant assembly hole 122. At block 220, the collet 132 is expanded so as to fit tightly in the hole 122. Due to the tight fit, the collet 132 may be used in any inverted orientation without falling out of the hole 122.

At block 230, the metrology target 134 is mounted to the collet 132. Once mounted, a reference point on the metrology target 134 is a known distance from a centerline of the collet 132 and, therefore, a known distance from a centerline of the hole 122.

At block 240, the measurement system 140 is used to measure a distance from a reference point on the target 134 to a reference position. The reference position may be a feature of a part (e.g., an edge or another hole of the part 120), or the reference position may be any other position within a know coordinate system. Since the distance from target reference point to the determinant assembly hole centerline is known, the distance from the centerline to the reference position is also known.

In FIG. 1, the metrology target 134 is a tracking ball whose center is aligned with the centerline of the collet 132. The tracking ball has a radius R. When the collet 132 is expanded to fit tightly within the hole 122, the collet's centerline is aligned with the centerline of the determinant hole 122. The measurement system 140 measures a distance vector d1 to a surface of the tracking ball 134. Assuming the distance vector d2 from the measurement system 140 to the reference point is known, the relative location of the hole 122 to the reference position (REF) may be determined.

In some embodiments, a single apparatus 130 may be used to locate one hole at a time. In other embodiments, multiple apparatuses 130 may be used to locate multiple holes simultaneously. Multiple holes may be located simultaneously to determine the relative locations of the multiple holes with respect to each other.

At block 250, the measurement system 140 labels and records the measurements. Measurement data may be exported to another system, such as a robotic system or a CAD system.

The method and system are especially advantageous for composite parts and other parts that are difficult to machine. Even if the required precision of a determinant assembly hole is not achieved, the method and system allow the precise location of the hole to be determined.

Determinant assembly may be used to assemble aerospace structures including composite parts. For example, determinant assembly holes may be drilled into structural composite components such as frames, stanchions, and floor beams of fuselages, and wing boxes of wing assemblies. A system and method herein may be used to determine the precise locations of those holes prior to assembly.

After the precise locations have been determined, the parts are assembled together with temporary (e.g., tack) fasteners. In some instances, the temporary fasteners may be inserted into the determinant assembly holes. After the parts have been assembled, the parts are permanently fastened. For instance, the locations of fasteners holes are measured from the determinant assembly holes. At each location, a hole is drilled, a fastener is inserted into the hole, and the fastener is terminated. In the construction of large commercial aircraft, these fastening operations may be performed robotically.

Figure 3:
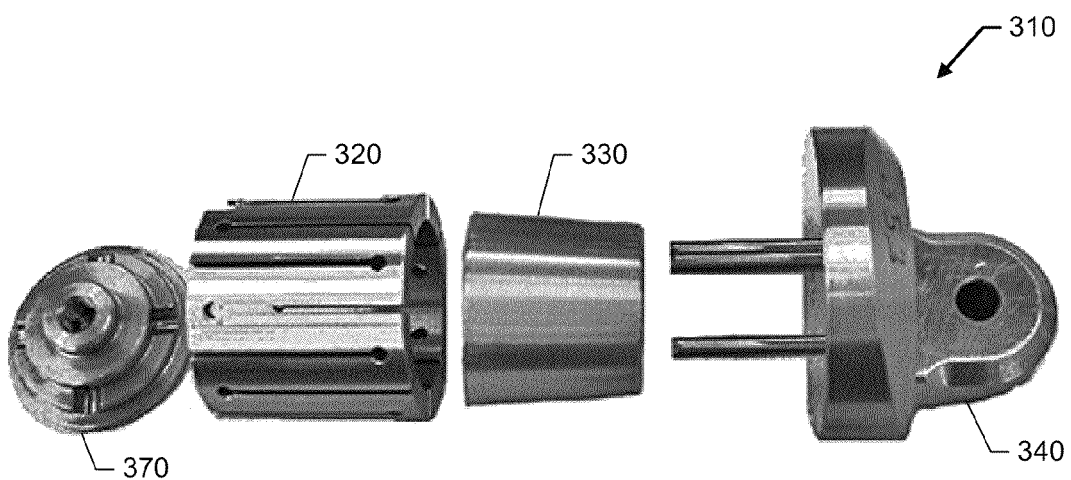
FIGS. 3 and 4 are illustrations of an example of an apparatus including an expandable collet and a metrology target.
Figure 4:
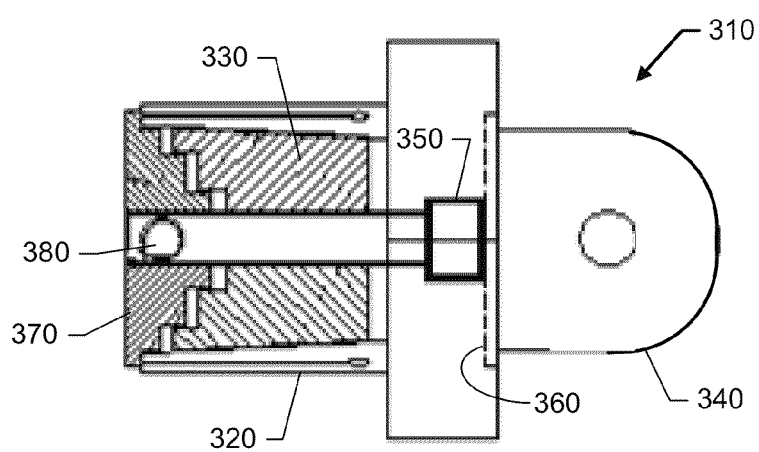

Reference is now made to FIGS. 3 and 4, which illustrate an embodiment of an apparatus 310 herein. FIG. 3 shows the apparatus 310 disassembled. The apparatus 310 includes a collet 320. The collet 320 is a cylindrical sleeve made of a material such as spring steel. Kerf cuts along its length allow the collet 320 to expand and contract.

The apparatus 310 further includes a conical expander 330 that is located within the collet 320. The expander 330 is constrained from rotating within the collet 320, but is allowed to slide along the length of the collet 320. When slid within the collet 320, the collet 320 expands and contracts. The expander 330 has a tapped hole in its center.

The apparatus 310 further includes a mount 340 at one end of the collet 320. Pins 342 extend from one side of the mount 340 to engage the expander 330 and prevent the expander 330 from rotating within the collet 320. The pins 342 not only prevent the expander 330 from rotating within the collet 320, but locate the expander 330 as well.

An opposite side of the mount 340 is configured to removably support the metrology target. The opposite side of the mount 340 may be configured to hold, for example, tracking balls, retro-reflectors, photogrammetry targets or other metrology targets.

An adjustment screw 350 is seated in the mount 340 and held captive by a cover plate 360, thereby limiting the adjustment screw 350 to rotation. The adjustment screw 350 is threaded onto the tapped hole in the expander 330 and extends through the expander 330 to engage a base plate 370 at on opposite side of the collet 320. The base plate 370 is threaded onto the adjustment screw 350 and is locked to the adjustment screw 350 by set screws 380. When the adjustment screw 350 is turned in one direction, the expander 330 slides in one direction along the length of the collet 320. When the adjustment screw 350 is turned in the opposite direction, the expander 330 slides in the opposite direction. The expander 330 is hard-stopped in either direction (by the base plate 370 and the mount 340) to limit the expansion and contraction of the collet 320. In some embodiments, the radius of the collet 320 may expand by three to five mils.

The invention claimed is:

1. Apparatus comprising:
    a collet; and
    a metrology target mounted at a first end of the collet, the target providing a reference point at a known distance from a reference point on the on the apparatus.

2. The apparatus of claim 1, further comprising a measurement system for measuring a distance to the metrology target.

3. The apparatus of claim 2, wherein the measurement system is laser-based and wherein the metrology target is a tracking ball.

4. The apparatus of claim 1, wherein the collet reference point is a centerline; and wherein the centerline maintains a fixed relationship with the target reference point as the collet is expanded.

5. The apparatus of claim 1, further comprising a mount for supporting the metrology target at the first end of the collet.

6. The apparatus of claim 5, further comprising an expander that is constrained to slide within the collet, the collet expanding as the expander is slid towards the mount.

7. The apparatus of claim 6, further comprising a bottom plate at an opposite end of the collet, and an adjustment screw extending from the metrology mount, though the expander, and engaging the bottom plate.

8. The apparatus of claim 6, wherein pins extend from one side of the mount to engage the expander and prevent the expander from rotating within the collet; and wherein an opposite side of the mount is configured to removably mount the metrology target.

9. The apparatus of claim 1, wherein collet is expandable by about 3-5 mils.

10. A determinant assembly system comprising:
    a part having a determinant assembly hole;
    a collet that fits tightly within the hole; and
    a metrology target mounted at a first end of the collet, the target providing a reference point at a known distance from a centerline of the collet.

11. The system of claim 10, further comprising a measurement system for measuring a distance to the metrology target.

12. The system of claim 10, wherein the centerline maintains a fixed relationship with the target reference point as the collet is expanded.

13. The system of claim 10, further comprising a mount for supporting the metrology target at the first end of the collet.

14. The system of claim 13, further comprising an expander that is constrained to slide within the collet.

15. The system of claim 14, further comprising a bottom plate at an opposite end of the collet, and an adjustment screw extending from the metrology mount, though the expander, and engaging the bottom plate.

16. The system of claim 14, wherein pins extend from one side of the mount to engage the expander and prevent the expander from rotating within the collet; and wherein an opposite side of the mount is configured to removably mount the metrology target.

17. The system of claim 10, wherein the part is an aerospace part.

18. A method of measuring a hole location with respect to a reference position, the method comprising:
    fitting an expandable collet tightly in the hole;
    mounting a metrology target to the collet at a fixed distance from a centerline of the hole; and
    measuring distance from the target to the reference position.

19. The method of claim 18, wherein the hole is a determinant assembly hole.

20. The method of claim 18, wherein the reference position is a feature of an aerospace part.

* * * * *